(12) United States Patent
Swan

(10) Patent No.: US 7,426,568 B2
(45) Date of Patent: Sep. 16, 2008

(54) SEEK MINIMIZED RECOVERABLE STREAMING FILE SYSTEM

(75) Inventor: Paul R. Swan, Sunnyvale, CA (US)

(73) Assignee: LSI Corporation, Milpitas, CA (US)

(*) Notice: Subject to any disclaimer, the term of this patent is extended or adjusted under 35 U.S.C. 154(b) by 817 days.

(21) Appl. No.: 10/167,172

(22) Filed: Jun. 10, 2002

(65) Prior Publication Data
US 2004/0019750 A1 Jan. 29, 2004

(51) Int. Cl.
*G06F 15/16* (2006.01)

(52) U.S. Cl. .................... 709/231; 709/233; 709/236

(58) Field of Classification Search .......... 709/230, 709/231, 233, 236, 238, 246, 201–53
See application file for complete search history.

(56) References Cited

U.S. PATENT DOCUMENTS

| 4,287,577 | A | * | 9/1981 | Deal, Jr. .................... 365/233 |
| 4,400,778 | A | * | 8/1983 | Vivian et al. .................. 710/1 |
| 4,604,687 | A | * | 8/1986 | Abbott ........................ 707/200 |
| 5,197,146 | A | * | 3/1993 | LaFetra ....................... 711/144 |
| 5,319,778 | A | * | 6/1994 | Catino ......................... 707/102 |
| 5,422,727 | A | * | 6/1995 | Iida ............................. 358/296 |
| 5,732,256 | A | * | 3/1998 | Smith ............................ 707/1 |
| 6,052,328 | A | * | 4/2000 | Ternullo et al. ............. 365/233 |
| 6,124,868 | A | * | 9/2000 | Asaro et al. ................. 345/558 |
| 6,292,805 | B1 | * | 9/2001 | Basso et al. .............. 707/104.1 |
| 6,470,411 | B2 | * | 10/2002 | Artigalas et al. ............... 711/4 |
| 6,499,083 | B1 | * | 12/2002 | Hamlin ....................... 711/112 |
| 6,798,973 | B2 | * | 9/2004 | Gough ......................... 386/68 |
| 6,941,419 | B2 | * | 9/2005 | Haines et al. ............... 711/112 |
| 2001/0052056 | A1 | * | 12/2001 | Acton et al. ................ 711/147 |

* cited by examiner

*Primary Examiner*—Saleh Najjar
*Assistant Examiner*—Vitali Korobov
(74) *Attorney, Agent, or Firm*—Christopher P. Maiorana, PC

(57) ABSTRACT

A method for storing data, comprising the steps of (A) receiving a stream of data, (B) storing the stream of data in a series of data clusters each comprising (i) a predecessor link, (ii) a data portion, and (iii) a successor link, where the predecessor links and successor links are configured to minimize seek time between the clusters during contiguous stream operations.

22 Claims, 4 Drawing Sheets

SEEK MINIMIZED RECOVERABLE STREAMING FILE SYSTEM

CROSS REFERENCE TO RELATED APPLICATIONS

The present application may relate to co-pending application Ser. No. 10/166,868, filed concurrently, which is hereby incorporated by reference in its entirety.

FIELD OF THE INVENTION

The present invention relates to personal video recorders generally and, more particularly, to a seek minimized recoverable streaming file system.

BACKGROUND OF THE INVENTION

Conventional personal video recorders (PVRs) use standard personal computer file systems or modified variations of a personal computer file system. Such file systems have a number of disadvantages when used in a personal video recorder. First, such file systems have irregular data transfer rates. In particular, the file system management overheads can cause the data transfer rate to be irregular and/or non-deterministic. Second, data transfer rates are not homogeneous. For example, the data transfer rate depends on the direction of the streaming such that files streamed backwards have a poorer data transfer rate than those streamed forwards. Conventional PVRs often implement a large memory cache to mitigate this problem. Third, personal computer file systems use time consuming recovery algorithms. In particular, general personal computer file systems have expensive recovery algorithms that are used when there is an unexpected power outage.

Therefore, conventional general purpose file systems do not adequately address the needs of applications that (i) use high streaming data transfer rates and (ii) operate in a harsh consumer environment.

It would be desirable to implement an embedded personal video recording product that uses storage space provided by a storage device that (i) is managed efficiently, (ii) is managed in a way suitable for a consumer product, (iii) is implemented with a recoverable streaming file system and/or (iv) minimizes overheads (i.e., seeks).

SUMMARY OF THE INVENTION

The present invention concerns a method for storing data, comprising the steps of (A) receiving a stream of data, (B) storing the stream of data in a series of data clusters each comprising (i) a predecessor link, (ii) a data portion, and (iii) a successor link. The successor links and the predecessor links are configured to minimize seek time between the clusters during contiguous stream operations.

The objects, features and advantages of the present invention include providing a seek minimized recoverable streaming file system that may (i) implement data block linkage structures that are co-located (e.g., distributed or embedded) with the data block referred to, (ii) implement data blocks that are bi-directionally linked, (iii) provide a strict block linkage method to ensure data blocks are linked correctly on the storage media at all times, (iv) be implemented with minimal seeks to build or follow data block links, (v) allow the file system management overheads to be both deterministic and minimal without the use of a large file system cache and allow file system integrity to be maintained, (vi) implement a file system overhead that is the same for both forward and reverse streaming, (vii) be implemented without losing data blocks and/or (viii) be implemented without an expensive data block reclamation method.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may implement a file system that has a number of features that solve the problems described in the background section. Data block linkage structures of the present invention are generally co-located (e.g., distributed or embedded) with the data block referred to. Data can be written or read without referring to a central file table. For example, additional seeks to a central file table may be avoided by moving directly from one data block to the next data block in response to the link information stored in connection with the data blocks. The file system management overhead of the present invention may be both deterministic and minimal without the use of a large file system cache.

Data blocks of the present invention are generally bidirectionally linked. In particular, the file system overhead is the same for both forward and reverse streaming when reviewing and/or presenting streams of data. Strict data block linkage implemented via the present invention (e.g., embedding link information with the data) generally provides data blocks that are always linked correctly on the media. In contrast to conventional file systems that reference a file table, with the present invention data blocks are generally not lost during an unexpected power loss. Expensive data block reclamation is not needed. The data within a file of the present invention is contained within one or more data blocks (or clusters). Each data cluster has a unique identification that forms the basis of links to and between data clusters.

Figure 1:
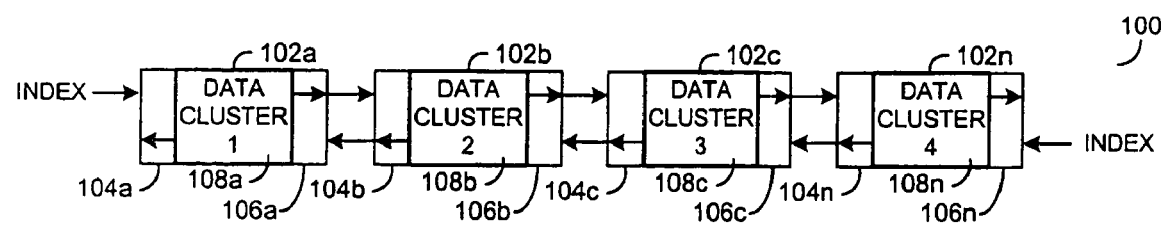
FIG. 1 is a diagram illustrating a basic structure of a file comprising a number of data clusters.

Referring to FIG. 1, a basic structure of a file system 100 comprising a number of data clusters 102a-102n is shown. A number of data clusters 102a-102n generally form a chain. The file system 100 may comprise a number of chains (not shown). The data cluster 102a generally comprises a predecessor link 104a, a successor link 106a and a data portion 108a. The predecessor link 104a may store an address of the previous data cluster 102a-102n (e.g., 102 (a−1)). Similarly, the successor link 106a may store an address of the next data cluster 102a-102n (e.g., 102b). The other data clusters 102b-102n may have a similar construction. The arrows between the data clusters 102a-102n illustrate a transition from a particular data portion (e.g., 108a) to (i) another particular data portion (e.g., 108b) in response to a successor link (e.g., 106a) when the data is moving forward or (ii) a predecessor link (e.g., 104b) if the data is moving in reverse (e.g., from the data portion 108b). The particular number of data clusters 102a-102n may be varied to meet the design criteria of a particular implementation. In particular, the length of a particular recorded program, and the quality of the recording generally determines the number of data clusters 102a-102n needed to store the program in a particular data cluster chain. In general, each data cluster chain stores an individual program.

The file system 100 may be implemented as one or more individually accessible bi-directionally linked data cluster chains. The first data cluster in a chain (e.g., data cluster 102a) and the last cluster in the chain (e.g., 102n) are illustrated receiving a signal (e.g., INDEX). The signal INDEX refers to a reference from a file table index for the beginning (e.g., HEAD) and end (e.g., TAIL) of the chain. While the signal INDEX references a file table for the chain, individual links between individual clusters (e.g., between data cluster 102a and 102b or between data cluster 102b and 102c, etc.) do not reference such a central file table. Within a particular data cluster chain, the data clusters 102a-102n link to each other bi-directionally with a predecessor link (e.g., a link 104a that is physically located at the chronological start of the data cluster) and a successor link (e.g., a link 106a that is physically located at the chronological end of the data cluster). The bi-directionally linked data clusters 102a-102n of the present invention generally provide a method for storing data that has minimal seek time in transitions between the particular clusters 102a-102n since subsequent and predecessor cluster links do not have a seek to a central file table. The transfer rate of a particular chain is generally homogeneous when the file system 100 is streaming either forward (e.g., receiving data) or backward (e.g., presenting data)

When the present invention is implemented in the context of a streaming video application, the individual data clusters 102a-102n may be implemented to store large portions of data (e.g., a 20 second portion, a one minute portion, etc.). If each cluster holds one minute of video (e.g., approximately 1-2 megabytes of information), a one hour program (e.g., approximately 1-2 gigabytes of information) may be implemented with 60 seeks. In contrast, in a conventional file system using 32K byte clusters, a 2 Gb file would need 65,536 seeks, more than 1000× as many as needed with the present invention.

Figure 2:
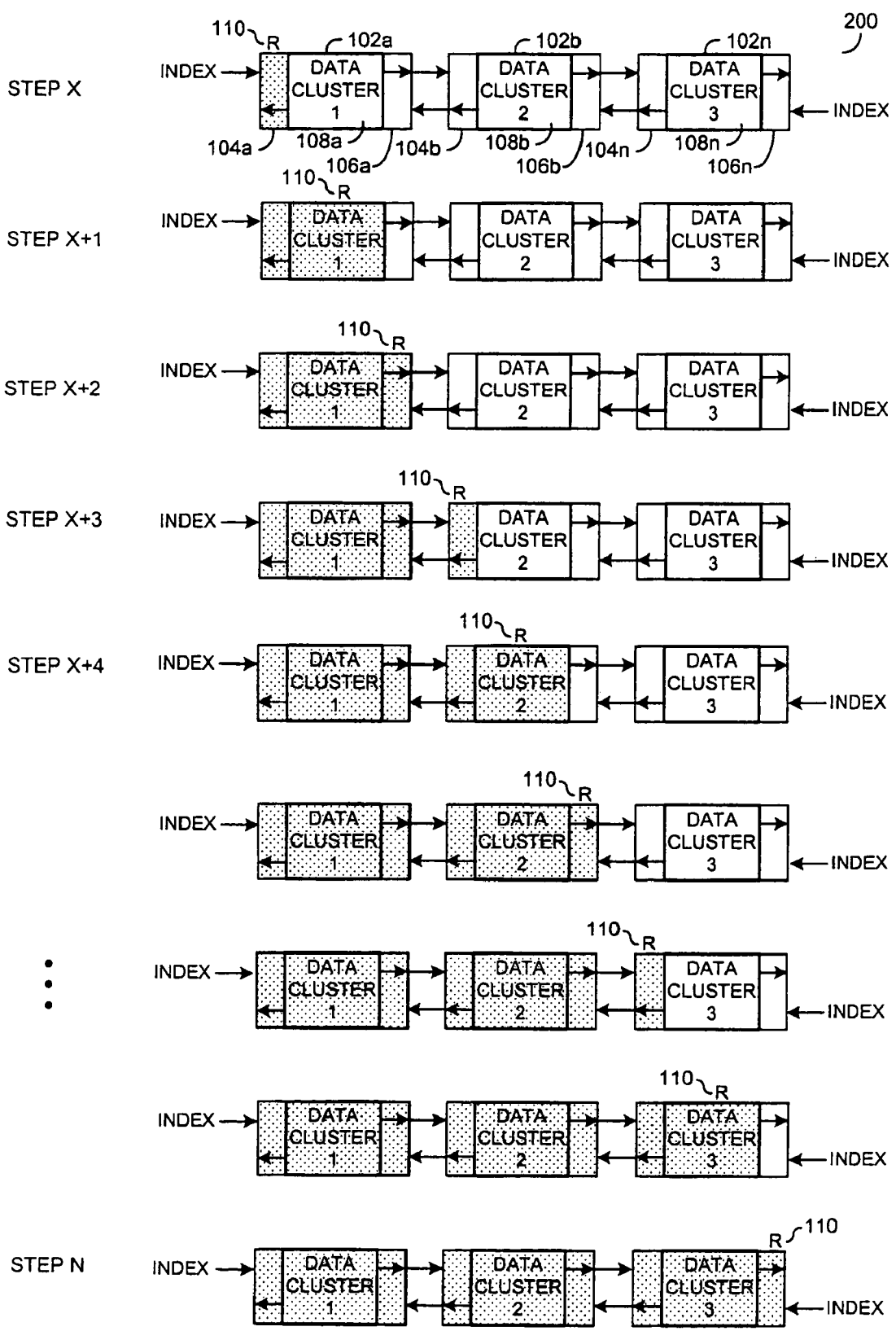
FIG. 2 is a diagram illustrating data transfer during a forward streaming read.

Referring to FIG. 2, a diagram 200 illustrating data transfer during a forward streaming read is shown. The streaming read operation 200 may be performed in response to data read pointer 110 moving through the data clusters 102a-102n. The data cluster chain 100 is shown in a number of successive states labeled Step X-Step N. The data clusters 102a-102n and respective links 104a-104n and 106a-106n are accessed through the process (steps, states, method, etc.) 200 as illustrated. The data cluster 102a may be at the HEAD of a chain and the data cluster 102n may be at the TAIL of the chain. When the read pointer 110 of the file 100 is encountered at the end of a current data cluster (e.g., the cluster 102a in the Step X+1), and the data read pointer 110 remains active, the link 106a to the successor data cluster (e.g., 102b) is read (e.g., the step X+2). Since the link 106a is generally physically located immediately after (e.g., adjacent to) the last portion of file data 108a read in the data cluster 102a, no seek is needed to obtain the position of the next portion of data (e.g., the data 108b).

Before file data 108 is read from the successor data cluster 102b (e.g., prior to the step X+4), the predecessor link 104b is read and checked to ensure correct linkage (e.g., the Step X+3). Since the link 104b is generally physically located immediately before (e.g., adjacent to) the first portion of file data 108b to be read in the data cluster 102b, no seek is incurred to obtain data 108b from the next cluster 102b. The forward stream read operation 200 may proceed in a similar manner through the data clusters 102b-102n. Reverse streaming data transfer reads generally operate in a similar way starting from the TAIL 106n following the predecessor links 104n-104b and verifying the successor links 106(n−1)-106a.

Figure 3:
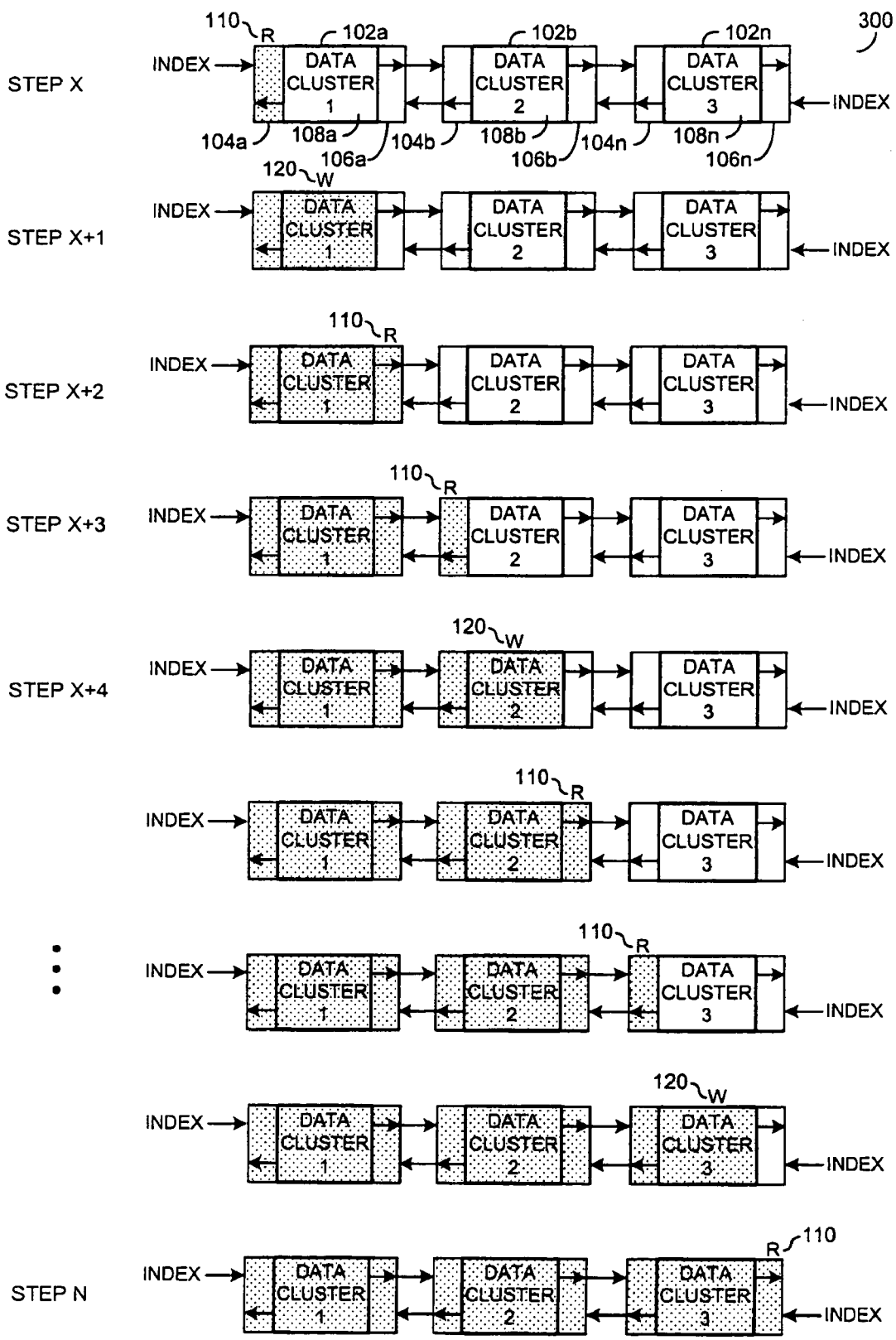
FIG. 3 is a diagram illustrating data transfer during a forward streaming over-write of data.

Referring to FIG. 3, a diagram 300 illustrating data transfer during a forward streaming over-write of data is shown. The forward streaming over-write operation 300 may be performed in response to a data write pointer 120 and a successor link 106. The data clusters 102a-102n and respective links 104 and 106 through the process (e.g., steps, states, methods, etc.) are accessed as illustrated. When the successor link (e.g., 106a) of the file 100 is encountered at the end of a current data cluster 102a (e.g., the Step X+1), and the data write pointer 120 remains active (e.g., W), the link 106a to the successor data cluster 102b is read (e.g., the Step X+2). Since the link 106a is physically located immediately after (e.g., adjacent to) the last portion of file data 108a written in the data cluster 102a, no seek is needed to access the data. Before the file data 108b is written to the successor data cluster 102b (e.g., the step X+5), the predecessor link 104b is read and checked to ensure correct linkage (e.g., the step X+4). Since the link 104b is physically located immediately before (e.g., adjacent to) the first portion of file data 108b to be written in the data cluster 102b (e.g., via the step X+5), no seek is needed to obtain data from the next cluster. The forward streaming overwrite process 300 may proceed in a similar manner through the data clusters 102c-102n. Reverse streaming over-write of data may be implemented similarly to the process (method, steps) 300.

Figure 4:
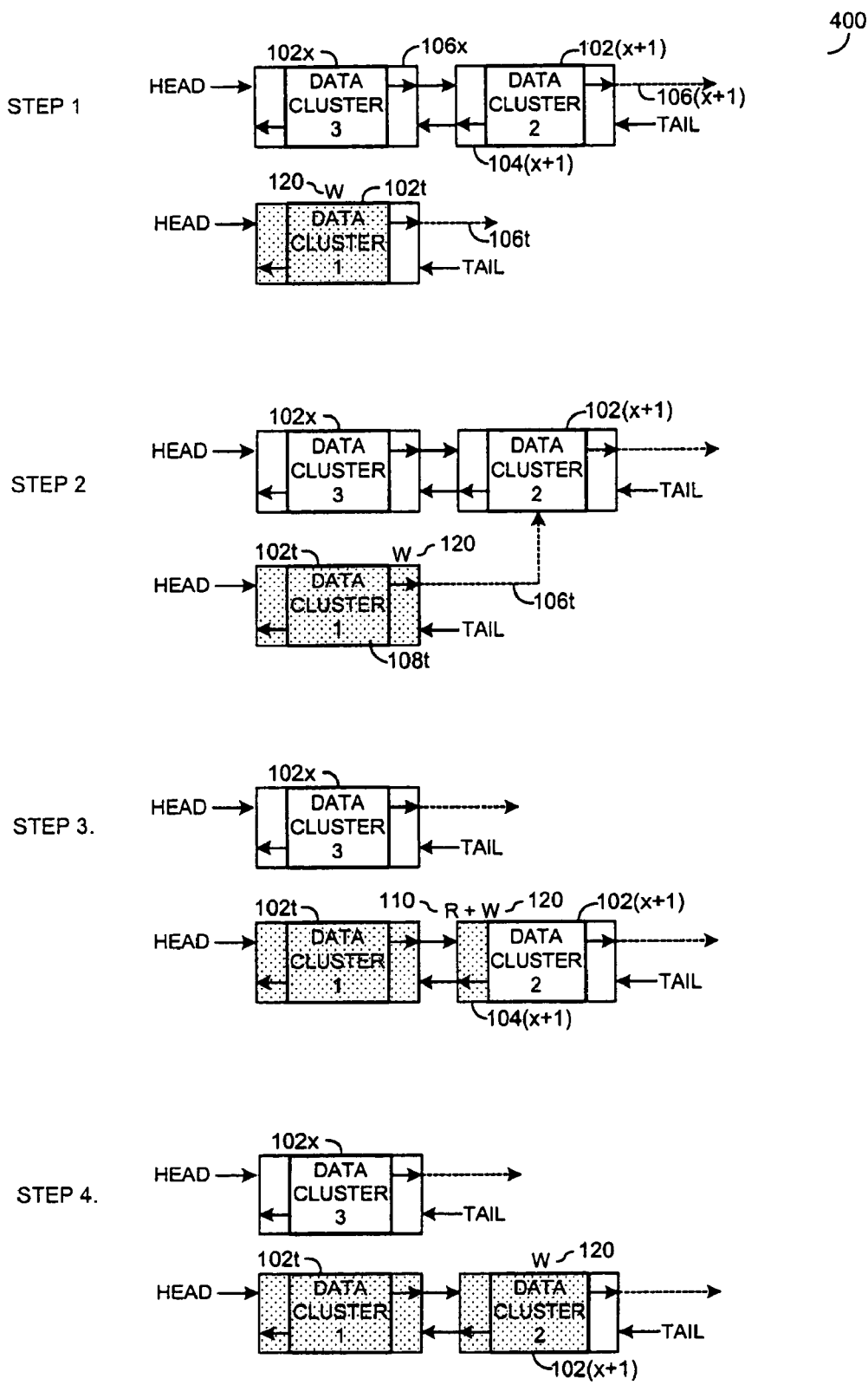
FIG. 4 is a diagram illustrating adding free data clusters to a file chain.

Referring to FIG. 4, a diagram 400 illustrating the allocation a free data clusters 102 to a file chain 100 is illustrated. During a forward streaming appended-write of file data 108, data cluster chains 100 are generally extended as more file data space is needed. Unused data clusters 102 are held on a chain of free clusters (e.g., the construction of a free cluster chain is generally performed as part of the file system formatting operation).

FIG. 4 shows the four steps involved in the construction of data cluster chains 100 via the process 400. The top chain in the diagram (e.g., the clusters 102 and 102(x+1) represents the free data cluster chain and the bottom chain in the diagram (e.g., the cluster 102t) represents the file data cluster chain 100. The links 106 (x+1) and 106t from the TAIL of data clusters 102 (x+1) and 102t, respectively, indicate harmless invalid links left over from prior data cluster 102 transfer operations.

In Step 1, the write pointer W (e.g., 120) of the file 100 remains active while the write reaches the end of the TAIL of the data cluster 102t of the file chain 100. In Step 2, the (invalid) link 106t to the successor data cluster in the TAIL data cluster of the file chain is overwritten to link to the TAIL data cluster 102(x+1) of the free chain. Since this link (e.g., 106t) is physically located immediately after (e.g., adjacent to) the last portion of file data 108t written in the TAIL data cluster 102t of the file chain 100, no seek is needed to write the new link.

In Step 3, the predecessor link 104 (x+1) is read from the current TAIL data cluster of the free chain (e.g., the cluster 102(x+1)) to provide the new predecessor link 104(x+1) of the free chain. This predecessor link (e.g., the link (x+1)) is then overwritten to generate a valid predecessor link 104(x+1) to the current TAIL data cluster of the file chain 100 and the data cluster 102 (x+1) then becomes the TAIL data cluster of the file chain 100. Similarly, the successor link 106t is overwritten by the link 106 (x+1). Since the link 106 (x+1) is physically located immediately before (e.g., adjacent to) the first piece of file data 108 (x+1) to be written in the new data cluster 102 (x+1), no seek is needed to read and write data.

In Step 4, the write pointer 120 of the file 100 may continue into the new TAIL data cluster (e.g. the cluster 102(x+1)) of the file chain 100. File data clusters 102 are generally transferred back onto the TAIL of the free chain in a similar manner (e.g., for file delete or file truncation operations). The operation 400 is implemented as a general method, process, etc. for the transfer of one cluster 102 from the TAIL of one chain to the TAIL of another chain.

Files of the present invention (e.g., the file 100) that are implemented in read and/or write-over operations (e.g., the operations 200 and/or 300) do not generally need any recovery after a power outage since the cluster linkage is not altered during these operations. Files of the present invention that are implemented for write-append operations (e.g., the operation 400) do not generally have TAIL links recorded on the media when they are in use. Therefore, recovery is generally performed when power is restored before re-use of the file 100. Recovery of files 100 with missing TAIL links may be performed by starting at the HEAD of the chain 100 and following the data cluster 102, bi-directional links 104 and/or 106 forward until the last cluster 102 in the chain 100 is reached. The last cluster 102 generally becomes the TAIL of the chain 100.

The determination of the last data cluster 102 in a particular chain 100 may be based on a valid predecessor link 104 in the successor data cluster 102. The data cluster 102$y$ represents a current data cluster and the data cluster 102 (y+1) represents a successor data cluster linked to by the successor link 106. If the predecessor link 104 in data cluster 102 (y+1) links to the data cluster 102$y$, then the data cluster 102$y$ is not the TAIL cluster of the chain 100 and the data cluster 102(y+1) may become the current data cluster.

If the predecessor link 104(y+1) in the data cluster 102(y+1) does not link to the data cluster 102$y$, then a data cluster 102$q$ (e.g., an alternate cluster) generally represents the data cluster linked by the predecessor link 104(y+1) in data cluster 102(y+1). If the successor link 106$q$ in the data cluster 102$q$ links to the data cluster 102(y+1) then the data cluster 102$y$ generally becomes the TAIL data cluster of the chain 100. If the successor link 106$q$ of the data cluster 102$q$ does not link to the data cluster 102(y+1), then the data cluster 102$y$ is generally not the TAIL of the chain 100. The predecessor link 104(y+1) in the data cluster 102(y+1) is generally overwritten to link to the data cluster 102$y$ and the data cluster 102(y+1) generally becomes the current data cluster. The latter case ensures that a data cluster 102 does not become orphaned (e.g., one or more chains 100 do not have a valid link to each data cluster 102). The generation of non-linked data clusters 102 should not generally occur in practice. However, the present invention provides a fall back.

The present invention may be enhanced by holding all the cluster links in a memory (not shown) using a write-through mechanism. Such a memory may eliminate the read component of the read-modify-write operations illustrated in FIG. 4 and may eliminate the need to switch the read/write mechanism heads (not shown) from write to read (e.g., R+W) link when building links during a streaming write. Such a memory may also reduce the time taken to randomly access data in the middle portion of a file since all the links that need to be followed to get to the data are generally in memory. Such a memory may be an optimization for some storage devices (e.g., DVD-RAM) that have poor head mechanism switch and seek performance. Recoverability is generally unaffected.

In a typical use situation, one write stream (e.g., for recording) and one read stream (e.g., for playback, time-shift, etc.) may be in use simultaneously. Therefore, there may be a back-and-forth access pattern between the two files or between points within the same file. Such a pattern of back-and-forth access between files may be optimized such that the size of data clusters 102 are an integer multiple of the data blocks transferred. Such access may hide the cluster to cluster seek since such a link occurs at the same time as the file to file seek.

In one example, file A (not shown) may have clusters 35, 47, 72, 18. File B (not shown) may have clusters 74, 63, 55, 99. The Sk prefix represents a seek, the Rd prefix a Rd and the Wr prefix a write. Read of file A alone may appear as Sk35, Rd35, Sk47, Rd47, Sk72, Rd72, Sk18, Rd18. Write of file B alone may appear as Sk74, Wr74, Sk63, Wr63, Sk55, Wr55, Sk99, Wr99. Read of file A and write of file B together, transfer aligned, may appear as Sk35, Rd35, Sk74, Wr74, Sk47, Rd47, Sk63, Wr63, Sk72, Rd72, Sk55, Wr55, Sk18, Rd18, Sk99, Wr99. Read of file A and write of file B together, transfer miss-aligned may appear as Sk35, Rd35, Sk74, Wr74, Sk35, Rd35, Sk47, Rd47, Sk74, Wr74, Sk63, Wr63, Sk47, Rd47, Sk72, Rd72, Sk63, Wr63, Sk55, Wr55, Sk72, Rd72, Sk18, Rd18, Sk55, Wr55, Sk99, Wr99.

The streaming file system of the present invention (e.g., the bi-directionally linked file chain 100) may be implemented as a general purpose embedded file system for general data storage. The function performed by the diagrams of FIGS. 2-4 (e.g., the contiguous stream operations 200, 300, and/or 400) may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMS, EEPROMS, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for storing data, comprising the steps of:
   (A) receiving a stream of data;
   (B) storing said stream of data as a file in a series of data clusters each comprising (i) a predecessor link, (ii) a data portion, and (iii) a successor link, wherein said predecessor links and said successor links are configured to minimize seek time between said data clusters during contiguous stream operations by moving directly from a first data cluster to a second data cluster in response to an address of said second data cluster being stored within said first data cluster;
   (C) storing said file in one or more read or write-over operations without altering said predecessor links and said successor links during said storing operation, wherein said method avoids a recovery procedure after a potential power interruptions; and (D) appending to said file during one or more write-append operations by writing to a second series of data clusters each comprising (i) a predecessor link, (ii) a data portion, and (iii) a successor link, wherein (a) said appending occurs without recording said successor links of said second series of data clusters when said file is in use and (b) said appending allows an append recovery to be performed on said file after said potential power interruption.

2. The method according to claim 1, wherein said series of data clusters comprises a bi-directionally linked chain.

3. The method according to claim 2, wherein (i) a head pointer comprises a predecessor link configured to link a current one of said clusters to a predecessor one of said cluster and (ii) a tail pointer comprises a successor link configured to link said current cluster to a successor one of said clusters.

4. The method according to claim 3, further comprising the step of:
transforming said success or data cluster in to said current data cluster when said predecessor link in said successor data cluster links to said predecessor data cluster and when said predecessor data cluster is not a tail pointer.

5. The method according to claim 3, further comprising the step of:
linking an alternate data cluster to said predecessor link in said success or data cluster if said success or data cluster does not link to said current data cluster.

6. The method according to claim 5, wherein:
if said successor link in said alternate data cluster links to said successor data cluster then said current data cluster becomes a tail data cluster of said chain.

7. The method according to claim 5, wherein:
if the successor link of said alternate data cluster does not link to said successor data cluster then (i) said current data cluster is not the tail of said chain, (ii) said predecessor link in said successor data cluster is overwritten to link to said current data cluster, and (iii) said successor data cluster becomes said current data cluster.

8. The method according to claim 1, wherein said series of data clusters form a file system and said series of data clusters that are consecutively accessed without referencing a central file table to further minimize seek time between said data clusters.

9. The method according to claim 1, said method further comprising (i) checking linkage from a current one of said clusters to a successor one of said clusters and (ii) reading said stored data when said linkage is correct in response to a read pointer reaching an end of said current cluster.

10. The method according to claim 1, said method further comprising (i) checking linkage from a current one of said cluster to a successor one of said clusters and (ii) writing said data to said successor cluster when said linkage is correct in response to a write pointer reaching an end of said current cluster.

11. The method according to claim 1, said method further comprising, when a write pointer reaches an end of a tail cluster of said clusters (i) overwriting a link to a free cluster, wherein said free cluster is not in said series of clusters, (ii) reading a predecessor link in said free cluster, and (iii) overwriting said predecessor link to generate a link to said tail cluster.

12. The method according to claim 1, wherein said method operates in (i) a forward streaming data transfer mode, (ii) a reverse streaming data transfer mode, (iii) a forward streaming data over-write mode and (iv) a reverse streaming data over-write mode.

13. The method according to claim 1, further comprising the step of:
operating with in the context of a streaming video application.

14. The method according to claim 1, wherein (a) said predecessor link is physically located immediately before a first portion of file data to be written in said first data cluster and a seek to a central file table is not needed to obtain data from said second data cluster and (b) said successor link is physically located immediately after said first portion of said file data to be written in said first data cluster and a seek to said central file table is not needed to access said data.

15. The method according to claim 1, where in said predecessor link and said successor link operate without referencing a central file table.

16. The method according to claim 1, wherein said first data cluster stores an (i) an address of a data cluster before said first data cluster with in a predecessor link of said first data cluster and (ii) said address of said second data cluster within a successor link of said first data cluster.

17. An apparatus comprising a plurality of data clusters, wherein each of said data clusters comprises (i) a predecessor link, (ii) a data portion, and (iii) a success or link and said plurality of clusters are stored as a file and configured in series to minimize seek time between said clusters by moving directly from a first data cluster to a second data cluster in response to an address of said second data cluster being stored with in said first data cluster, and said file is stored during one or more read or write-over operations without altering said predecessor links and said success or links during said storing operation, wherein (a) said apparatus avoids a recovery procedure after a potential power interruption and (b) said apparatus appends to said file during one or more write-append operations by writing to a series of append data clusters, and each of said append data clusters comprises (i) a predecessor link, (ii) a data portion, and (iii) a success or link, (c) said append occurs without recording said success or links of said append data clusters when said file is in use and (d) said append allows an append recovery to be performed on said file after said potential power interruption.

18. The apparatus according to claim 17, where in said series of data clusters comprises a bi-directionally linked chain.

19. The apparatus according to claim 17, where in said series of data clusters form a file system and said series of data clusters are consecutively accessed without referencing a central file table to further minimize seek time between said data clusters.

20. The apparatus according to claim 17, wherein said apparatus is configured to operate in (i) a forward streaming data transfer mode, (ii) a reverse streaming data transfer mode, (iii) a forward streaming data over-write mode and (iv) a reverse streaming data over-write mode.

21. An apparatus for storing data comprising:
means for receiving a stream of data;
means for storing said stream of data in a series of data clusters stored as a file and each comprising (i) a predecessor link, (ii) a data portion, and (iii) a success or link, where in said predecessor links and said success or links are configured to minimize seek time between said data clusters during contiguous stream operations by moving directly from a first data cluster to a second data cluster in response to an address of said second data cluster being stored with in said first data cluster, and said file is stored in one or more read or write-over operations without altering said predecessor links and said success or links during said storing operation, where in said apparatus avoids a recovery procedure after a potential power interruption; and means for appending to said file during one or more write-append operations by writing to a second series of data clusters each comprising (i) a predecessor link, (ii) a data portion, and (iii) a successor link, wherein (a) said appending occurs without recording said success or links of said second series of data clusters when said file is in use and (b) said appending allows an append recovery to be performed on said file after said potential power interruption.

22. A method for storing data, comprising the steps of:
(A) receiving a stream of data;
(B) storing said stream of data as a file in a series of data clusters each comprising (i) a predecessor link, (ii) a data portion, and (iii) a successor link, wherein said predecessor links and said successor links are configured to minimize seek time between said data clusters during contiguous stream operations by moving directly from a first data cluster to a second data cluster in response to an address of said second data cluster being stored within said first data cluster;
(C) storing said file in one or more read or write-over operations without altering said predecessor links and said success or links during said storing operation, where in said method avoids a recovery procedure after a potential power interruption; and
(D) performing an append recovery by (i) starting at a head of said data clusters, (ii) following the first of said data clusters forward to the last of said data clusters, (iii) assigning the last of said data clusters as a tail of said data clusters, and (iv) basing a determination of the last of said data clusters on a valid predecessor link.

* * * * *